(12) United States Patent
Liu

(10) Patent No.: US 9,755,707 B2
(45) Date of Patent: Sep. 5, 2017

(54) METHOD AND APPARATUS FOR CALIBRATING MULTIPLE ANTENNAS

(71) Applicant: TELEFONAKTIEBOLAGET L M ERICSSON (PUBL), Stockholm (SE)

(72) Inventor: Chang Liu, Beijing (CN)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 78 days.

(21) Appl. No.: 14/764,535

(22) PCT Filed: Jan. 30, 2013

(86) PCT No.: PCT/CN2013/071140
§ 371 (c)(1),
(2) Date: Jul. 29, 2015

(87) PCT Pub. No.: WO2014/117341
PCT Pub. Date: Aug. 7, 2014

(65) Prior Publication Data
US 2015/0365140 A1    Dec. 17, 2015

(51) Int. Cl.
*H04B 7/04* (2017.01)
*H01Q 3/26* (2006.01)
(Continued)

(52) U.S. Cl.
CPC ............. *H04B 7/04* (2013.01); *H01Q 3/267* (2013.01); *H04B 17/11* (2015.01); *H04B 17/12* (2015.01);
(Continued)

(58) Field of Classification Search
CPC ...................................................... H04B 7/04
See application file for complete search history.

(56) References Cited

U.S. PATENT DOCUMENTS

| 5,255,086 A | * | 10/1993 | McMullan, Jr. | ....... H04H 20/42 348/E7.049 |
| 6,032,028 A | * | 2/2000 | Dickey | .................... H03C 3/40 332/117 |

(Continued)

FOREIGN PATENT DOCUMENTS

| CN | 102035076 A | 4/2011 |
| CN | 102624472 A | 8/2012 |
| GB | 2465752 A | 6/2010 |

OTHER PUBLICATIONS

Extended European Search Report dated Sep. 12, 2016, issued in European Patent Application No. 13874099.8, 6 pages.

*Primary Examiner* — Andrew Lai
*Assistant Examiner* — Andrew C Lee
(74) *Attorney, Agent, or Firm* — Rothwell, Figg, Ernst & Manbeck, P.C.

(57) ABSTRACT

A method and apparatus for calibrating multiple antennas in a radio communication device. The radio communication device is configured with a TX circuit and a RX circuit for each of the multiple antennas, each pair of the TX circuit and the RX circuit are operably coupled to the corresponding antenna in normal antenna operation. The apparatus comprises a first TX oscillator and a first RX oscillator. The first TX oscillator is operably coupled to the respective TX circuits to supply them with a TX working frequency or a RX calibrating frequency, the TX working frequency is supplied in the normal antenna operation and an antenna TX calibration operation, and the RX calibrating frequency is supplied in an antenna RX calibration operation. The first RX oscillator is operably coupled to the respective RX circuits to supply them with a RX working frequency or a TX calibrating frequency.

10 Claims, 8 Drawing Sheets

(51) Int. Cl.
*H04B 17/12* (2015.01)
*H04B 17/14* (2015.01)
*H04B 17/11* (2015.01)
*H04B 17/21* (2015.01)
*H04L 5/14* (2006.01)
*H04B 7/06* (2006.01)

(52) U.S. Cl.
CPC ............ *H04B 17/14* (2015.01); *H04B 17/21* (2015.01); *H04L 5/14* (2013.01); *H04B 7/06* (2013.01)

(56) References Cited

U.S. PATENT DOCUMENTS

| | | | |
|---|---|---|---|
| 2003/0171105 A1* | 9/2003 | Dunworth | H03L 7/0898 455/258 |
| 2004/0082356 A1* | 4/2004 | Walton | H04B 7/022 455/522 |
| 2004/0106380 A1* | 6/2004 | Vassiliou | H04B 17/20 455/73 |
| 2006/0135211 A1 | 6/2006 | Chae et al. | |
| 2006/0223558 A1* | 10/2006 | Behzad | H04B 1/0082 455/502 |
| 2007/0207759 A1* | 9/2007 | Vavelidis | H04B 17/21 455/232.1 |
| 2007/0232236 A1* | 10/2007 | Kasha | H04B 5/00 455/67.14 |
| 2010/0150013 A1* | 6/2010 | Hara | H04L 25/0224 370/252 |
| 2012/0300818 A1* | 11/2012 | Metreaud | H04B 1/30 375/219 |
| 2012/0309321 A1* | 12/2012 | Agarwal | H04W 72/1252 455/67.11 |
| 2013/0272175 A1* | 10/2013 | Zargari | H04L 5/14 370/281 |

* cited by examiner

METHOD AND APPARATUS FOR CALIBRATING MULTIPLE ANTENNAS

CROSS REFERENCE TO RELATED APPLICATION(S)

This application is a 35 U.S.C. §371 National Phase Entry Application from PCT/CN2013/071140, filed Jan. 30, 2013, designating the United States, the disclosure of which is incorporated herein in its entirety by reference.

TECHNICAL FIELD

The present technology generally relates to radio communication, particularly to a method and apparatus for calibrating multiple antennas in a radio communication device.

BACKGROUND

In the multiple antenna radio communication devices, antenna calibration (AC) circuits are often integrated with the antenna transmission (TX)/receiving (RX) circuits on the TX/RX board (also referred to as TRXB). In Time Division Duplex (TDD) device, the antenna TX frequency is equal to the antenna RX frequency, while in Frequency Division Duplex (FDD) device, the antenna TX frequency differs from the antenna RX frequency. In prior art, due to the differences above, TDD device and FDD device have to be configured with different antenna calibration circuits.

Generally, the TDD device utilizes the antenna calibration circuit as shown in FIG. 1, where the RX circuit 110 and the TX circuit 120 for the antenna 101 can be also configured to operate as the calibration circuit. The process of antenna TX calibration is illustrated in the FIG. 1. The dash lines show the flow path of the TX calibration signal to be transmitted by the individual antennas, and all the transmitted signals are received through the calibration circuit path illustrated by the solid line, such that the reception of the transmitted signal can be used for the TX calibration of the multiple antennas.

On the other hand, since the TX frequency and RX frequency are in the different frequency band in FDD system, the FDD device may be designed with the calibration circuit as shown in FIG. 2, where an extra dedicated calibration TX/RX path is added. In the calibration path, the RX frequency of the RX calibration path is consistent with the TX frequency of the FDD device antennas. In this way, the antenna TX calibration can be performed along the flow path as shown in the FIG. 2. Likewise, in the calibration path, the TX frequency of the TX calibration path needs to be consistent with the RX frequency of the FDD device antennas for the antenna RX calibration.

In addition, the FDD device may also be designed with the calibration circuit as shown in FIG. 3, where the extra calibration TX/RX path is not introduced, nevertheless a mixer 390 is still needed, which is used to remedy the gap of the antenna TX/RX frequency during the antenna calibration.

The disadvantages in the existing solution are obvious:
1) The TDD and FDD devices are using different hardware solution for the antenna calibration. In that case, they can't share the same hardware design. Accordingly, the software has to be modified because of the difference;
2) The solution for FDD is more complicated than TDD. In the solution as shown in FIG. 2, it has to involve a dedicated RX/TX calibration path to handle the function, which increases the cost and also consumes more layout area on the TRXB. In the solution as shown in FIG. 3, the additional mixer introduces a further undesirable nonlinearity, which will impact the accuracy of calibration result.

SUMMARY

Therefore, it is a strong desire to solve at least one of the above mentioned problems.

According to an aspect of the embodiments, there is provided an apparatus for calibrating multiple antennas in a radio communication device. The radio communication device is configured with a TX circuit and a RX circuit for each of the multiple antennas, each pair of the TX circuit and the RX circuit are operably coupled to the corresponding antenna in normal antenna operation. The apparatus comprises a first TX oscillator and a first RX oscillator. The first TX oscillator is operably coupled to the respective TX circuits to supply them with a TX working frequency or a RX calibrating frequency, the TX working frequency is supplied in the normal antenna operation and an antenna TX calibration operation, and the RX calibrating frequency is supplied in an antenna RX calibration operation. The first RX oscillator is operably coupled to the respective RX circuits to supply them with a RX working frequency or a TX calibrating frequency, the RX working frequency is supplied in the normal antenna operation and an antenna RX calibration operation, and the TX calibrating frequency is supplied in an antenna TX calibration operation. In the apparatus, the TX working frequency is the same as TX calibrating frequency, and the RX working frequency is the same as the RX calibrating frequency.

According to another aspect of the embodiments, there is provided an apparatus for calibrating multiple antennas in a radio communication device. The radio communication device is configured with a TX circuit and a RX circuit for each of the multiple antennas, each pair of the TX circuit and the RX circuit are operably coupled to the corresponding antenna in normal antenna operation. The apparatus comprises a first oscillator and a second oscillator. The first oscillator is operably coupled to the respective TX circuits to supply them with a TX working frequency, and coupled to the respective RX circuits to supply them with a TX calibrating frequency, the TX working frequency and TX calibrating frequency are supplied in an antenna TX calibration operation. The second oscillator is operably coupled to the respective RX circuits to supply them with a RX working frequency, and coupled to the respective TX circuits to supply them with a RX calibrating frequency, the RX working frequency and RX calibrating frequency are supplied in an antenna RX calibration operation. In the apparatus, the TX working frequency is the same as TX calibrating frequency, and the RX working frequency is the same as the RX calibrating frequency.

According to a further aspect of the embodiments, there is provided a method for calibrating multiple antennas in a radio communication device. The radio communication device is configured with a TX circuit and a RX circuit for each of the multiple antennas, each pair of the TX circuit and the RX circuit are operably coupled to the corresponding antenna in normal antenna operation. The method comprises: establishing a calibrating circuit for the multiple antennas, the calibrating circuit comprises a first TX oscillator and a first RX oscillator. The first TX oscillator is operably coupled to the respective TX circuits to supply them with a TX working frequency or a RX calibrating frequency, the first RX oscillator is operably coupled to the respective RX circuits to supply them with a RX working frequency or a TX calibrating frequency; In an antenna TX calibration operation, controlling the first TX oscillator to supply the TX circuits with the TX working frequency, and the first RX oscillator to supply the RX circuits with the TX calibrating frequency, where the TX working frequency is the same as TX calibrating frequency; In an antenna RX calibration operation, controlling the first TX oscillator to supply the TX circuits with the RX calibrating frequency, and the first RX oscillator to supply the RX circuits with the RX working frequency, where the RX working frequency is the same as RX calibrating frequency.

According to a still further aspect of the embodiments, there is provided a method for calibrating multiple antennas in a radio communication device. The radio communication device is configured with a TX circuit and a RX circuit for each of the multiple antennas, each pair of the TX circuit and the RX circuit are operably coupled to the corresponding antenna in normal antenna operation. The method comprises: establishing a calibrating circuit for the multiple antennas, the calibrating circuit comprises a first oscillator and a second oscillator, the first oscillator is operably coupled to the respective TX circuits to supply them with the TX working frequency, and coupled to the respective RX circuits to supply them with a TX calibrating frequency, the second oscillator operably coupled to the respective RX circuits to supply them with a RX working frequency, and coupled to the respective TX circuits to supply them with a RX calibrating frequency; In an antenna TX calibration operation, controlling the first oscillator to supply the TX circuits with the TX working frequency, and to supply the RX circuits with the TX calibrating frequency, where the TX working frequency is the same as TX calibrating frequency; In an antenna RX calibration operation, controlling the second oscillator to supply the TX circuits with the RX calibrating frequency, and to supply the RX circuits with the RX working frequency, where the RX working frequency is the same as RX calibrating frequency.

In the embodiments, the local oscillators provide different frequencies for the antenna TX/RX circuits in the different antenna operation modes. In this way, the antenna TX/RX circuit can be reused as the antenna RX/TX calibration circuit. Furthermore, they does not introduce extra non-linearity to the antenna calibration, the antenna calibration is more accurate and stable.

BRIEF DESCRIPTION OF THE DRAWINGS

The technology will now be described, by way of example, based on embodiments with reference to the accompanying drawings, wherein.

DETAILED DESCRIPTION

Embodiments herein will be described more fully hereinafter with reference to the accompanying drawings, in which embodiments are shown. This embodiments herein may, however, be embodied in many different forms and should not be construed as limited to the embodiments set forth herein. The elements of the drawings are not necessarily to scale relative to each other. Like numbers refer to like elements throughout.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Also, use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Unless otherwise defined, all terms (including technical and scientific terms) used herein have the same meaning as commonly understood. It will be further understood that terms used herein should be interpreted as having a meaning that is consistent with their meaning in the context of this specification and the relevant art and will not be interpreted in an idealized or overly formal sense unless expressly so defined herein.

The embodiments are described in the context of the FDD radio communication device, however, it should be understood that the embodiments may also be adapted to other communication device involving the antenna calibration, such as the TDD radio communication device. Moreover, herein, the antenna calibration apparatus is embedded in the radio communication device as antenna calibration circuit, specifically being integrated with the antenna TX/RX circuit on the TRXB, but it can also be implemented separately Embodiments herein will be described below with reference to the drawings.

Figure 1:
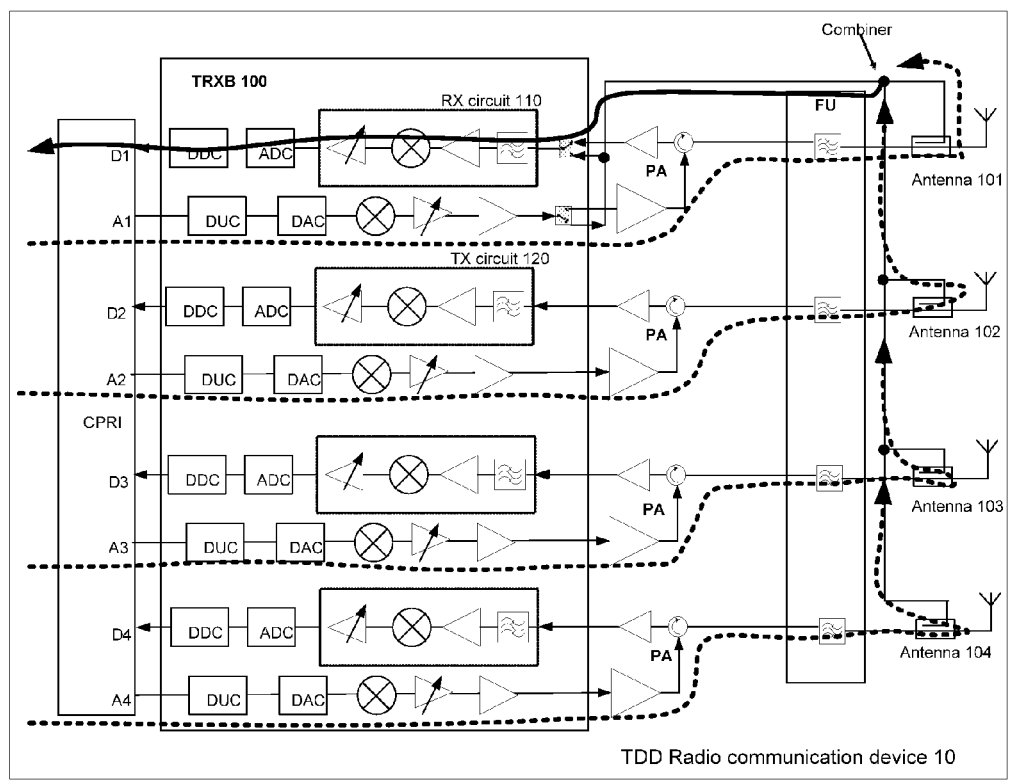
FIG. 1 schematically illustrates a diagram of multiple antennas calibration circuit in the TDD radio communication device.
Figure 2:
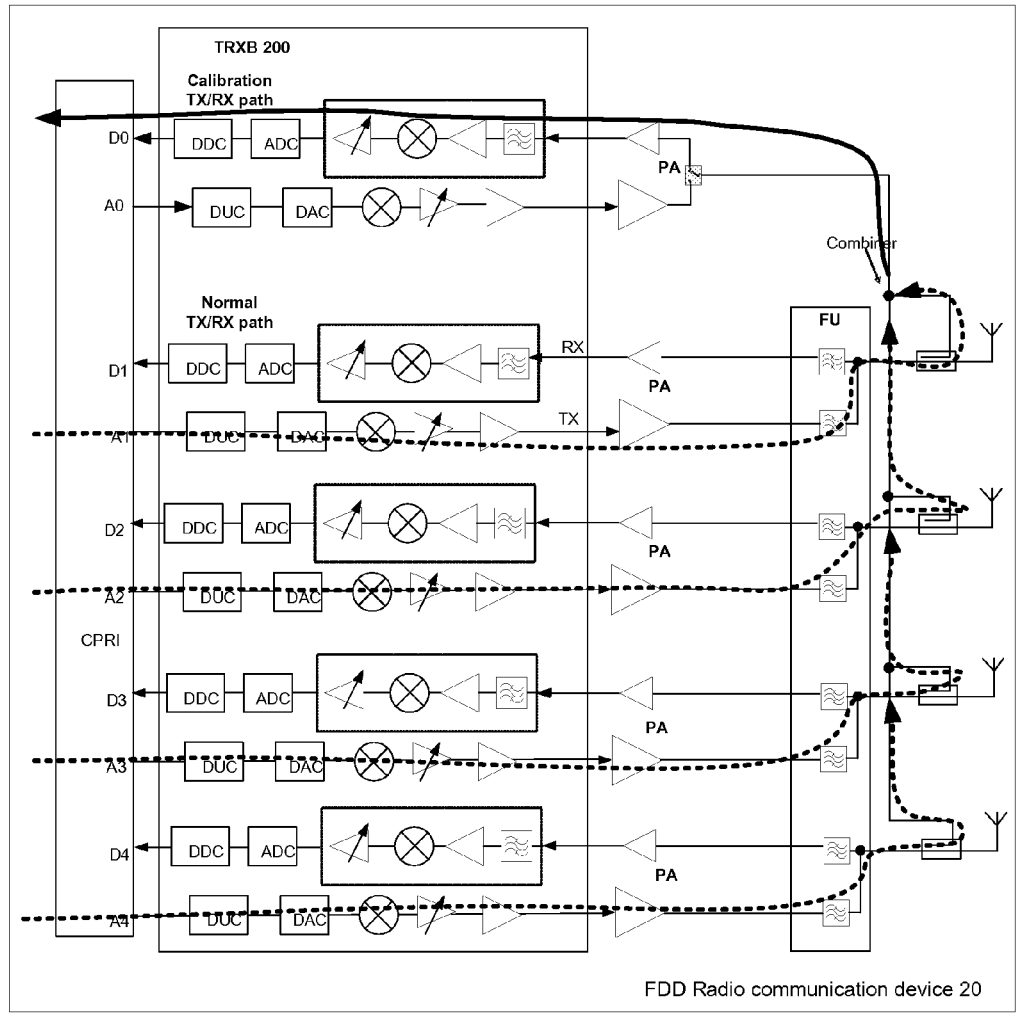
FIG. 2 schematically illustrates a diagram of multiple antennas calibration circuit in the FDD radio communication device.
Figure 3:
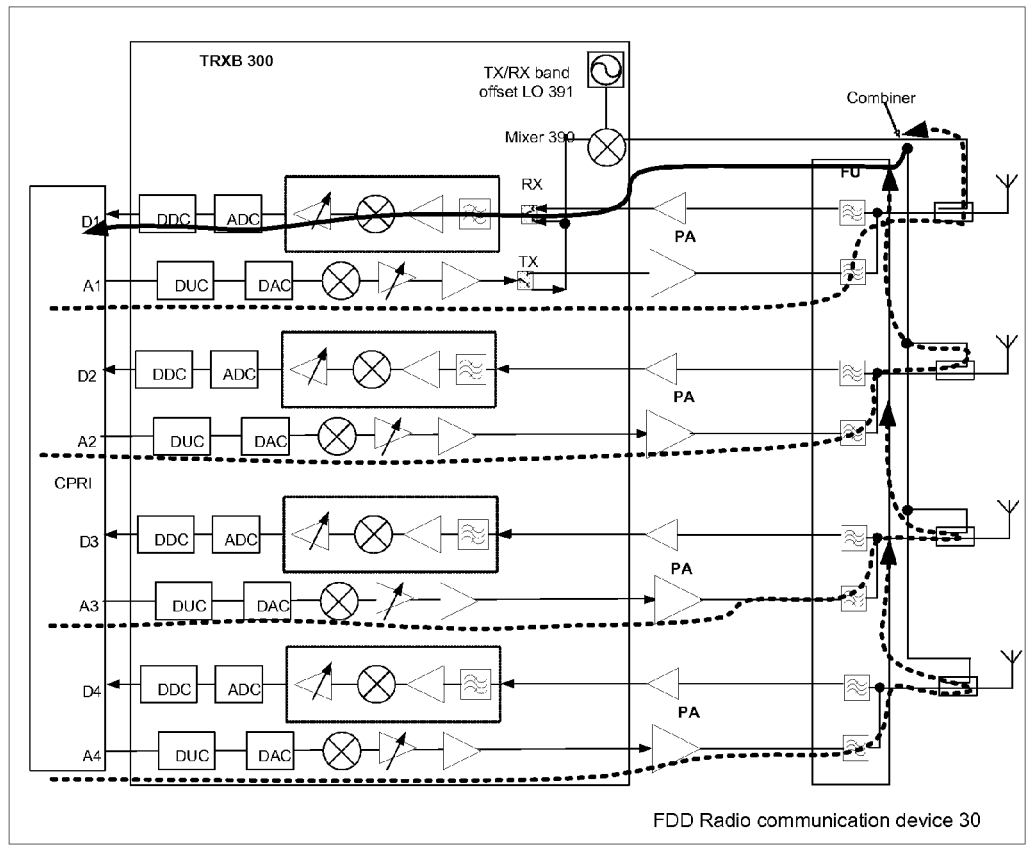
FIG. 3 schematically illustrates a diagram of multiple antennas calibration circuit in the FDD radio communication device.
Figure 4A:
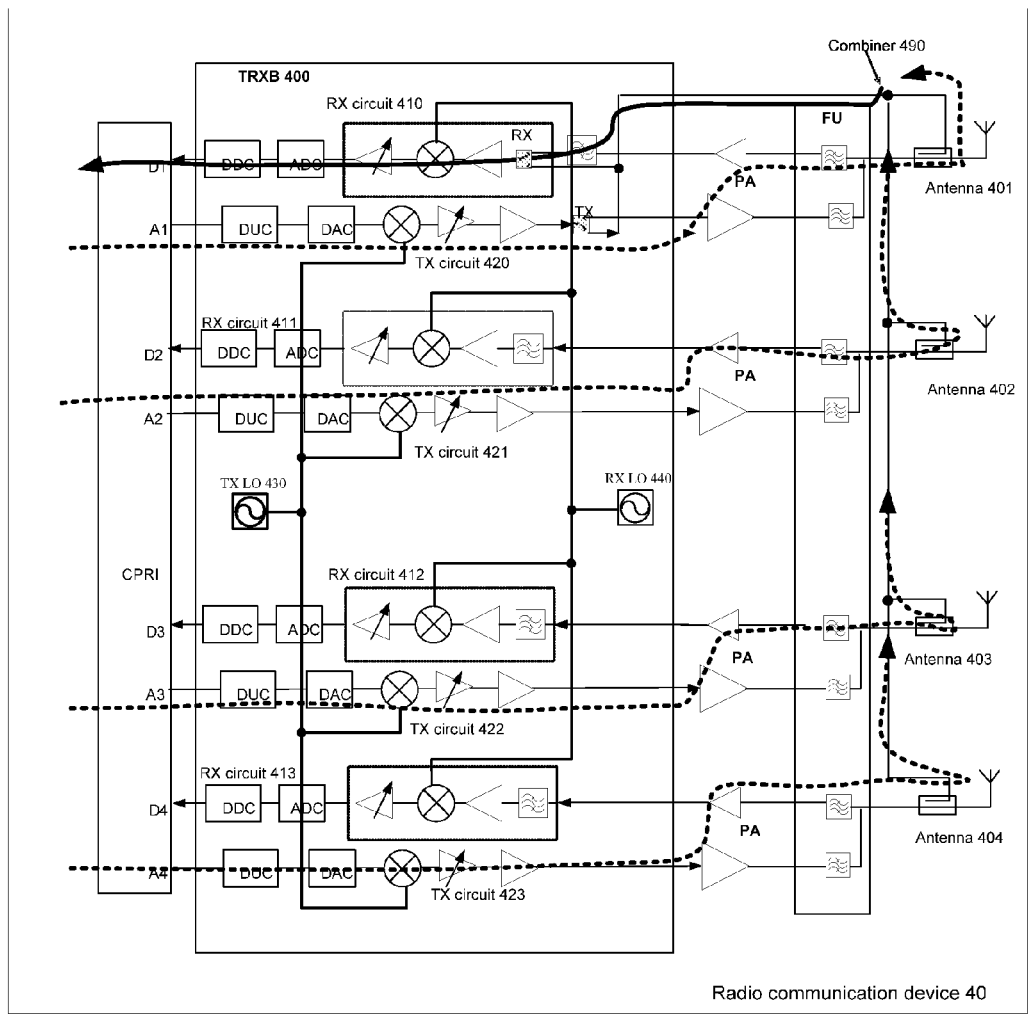
FIG. 4a schematically illustrates a diagram of multiple antennas calibration circuit in the radio communication device, in accordance with an embodiment.
Figure 4B:
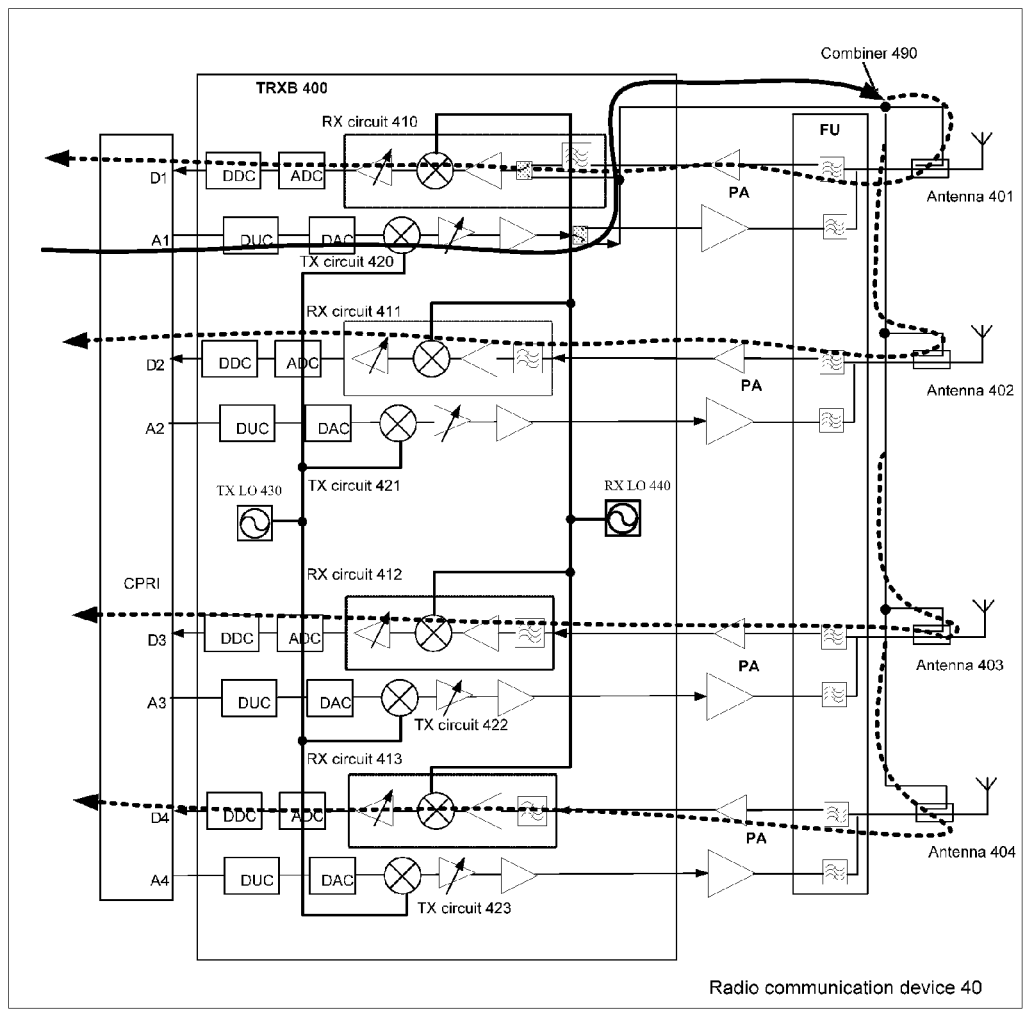
FIG. 4b schematically illustrates a diagram of multiple antennas calibration in the radio communication device, in accordance with an embodiment.

FIGS. 4a and 4b schematically illustrates a diagram of multiple antennas calibration circuit in the radio communication device. The flow path of antenna TX calibration is illustrated in FIG. 4a, and the flow path of antenna RX calibration is illustrated in FIG. 4b.

As shown in FIGS. 4a and 4b, the radio communication device 40 comprises TRXB 400 and the antennas 401-404. The TRXB 400 comprises the pairs of antenna RX circuits 410-413 and antenna TX circuits 420-423. The antenna TX/RX circuits may comprise the conventional mixer, band filter, DAC/ADC and attenuators, and the like, as well known to the skilled in the art. Each pair of TX/RX circuit is coupled to each of the respective antennas 401-414. Here, the RX circuit 410 and TX circuit 420 may also be reused as a part of the antenna calibration circuit. The antenna calibration circuit on the TRXB 400 may further comprise TX local oscillator (LO) 430 and RX LO 440. The TX LO 430 is coupled to TX circuits 420-423 and the RX LO 440 is coupled to RX circuits 410-413, in particular, coupled to the mixers of the antenna TX/RX circuits. Preferably, the local oscillators can be broadband oscillator.

Here, the radio communication device may refer to, by way of example and not limitation, a User Equipment (UE), such as a portable computer, a handheld computer such as a personal digital assistant (PDA), mobile phone, smart phone, and the like, and a communication node, such as base station, femto base station, NodeB, e-NodeB, access point etc. Moreover, it is noted that four antennas are illustrated in the radio communication device 40 by way of example; the embodiment is applied to the radio communication device with two or more antennas Generally, the antennas can work in three antenna modes, including the normal antenna mode, the antenna TX calibration mode and the antenna RX calibration mode. The antennas can be switched to work among the three modes periodically. Alternatively, the antennas may operate in the normal antenna mode when the normal signals need to be transmitted or received, and only when the antennas are idle, can the antennas is switched to the antenna TX/RX calibration mode to perform the antenna TX/RX calibration.

In the normal antenna operation, the TX LO 430 may provide the TX working frequency to the TX circuits 420-423, such that the signal can be transmitted at the antenna TX frequency by the radio communication device. Also, RX LO 440 may provide the RX working frequency to the RX circuits 410-413, such that the signal can be received at the antenna RX frequency by the radio communication device. Since the normal antenna operation mechanism is known to the skilled in the art, which therefore will not be described in more detail.

Next, the antenna TX calibration operation will be discussed with reference to the FIG. 4a.

In the antenna TX calibration mode, the RX circuit 410 will be switched to work as the calibration signal receiving circuit to receive the TX calibration signal transmitted from the individual antennas 401-404. At this point, the TX LO 430 may provide the TX circuits 420-423 with the TX working frequency as in the antenna normal operation, whereas the RX LO 440 may be adapted to provide the TX calibration frequency to the RX circuit 410. In order that the RX circuits 410 can receive the TX calibration signal successfully, the TX calibration frequency needs to be equal to the TX working frequency provided by the TX LO 430.

Specifically, the TX calibration signal is input into TX circuit 420-423 through the interface A1-A4. For now, the TX calibration signal is a digital signal. When the digital signal is going through the respective TX circuit, it is converted to the analog signal being a base band signal, modulated with the TX working frequency, and then properly attenuated by the attenuators in the TX circuit. Finally, the resulting TX calibration signal is transmitted by the respective antennas at the antenna TX frequency. The calibration signal transmitting process is illustrated in the FIG. 4a with the dash lines. Subsequently, the transmitted TX calibration signals converge to the combiner 490, which is the entry for the calibration signal receiving circuit, i.e. the RX circuit 410. As shown with the solid line in FIG. 4a, the arriving TX calibration signals experience the mixing by the TX calibration frequency, analog-to-digital conversion, etc in the RX circuit 410. Finally the received TX calibration signals are output to the interface D1, and they are input into the calibration unit (not shown) for calibrating the antennas, including the power calibration and the phase calibration.

Next, the antenna RX calibration operation will be discussed with reference to the FIG. 4b.

In the antenna RX calibration mode, the TX circuit 420 will be switched to work as the calibration signal transmitting circuit to transmit the RX calibration signal to the individual antennas 401-404. At this point, the RX LO 440 may provide the RX circuits 410-413 with the RX working frequency as in the antenna normal operation, whereas the TX LO 430 may be adapted to provide the RX calibration frequency to the TX circuit 420. In order that the TX circuits 420 can send the RX calibration signal that can be received by the individual antennas successfully, the RX calibration frequency needs to be equal to the RX working frequency.

Specifically, the RX calibration signal is input into calibration signal transmitting circuit, i.e. TX circuit 420 through the interface A1. For now, the RX calibration signal is a digital signal. When the digital signal are going through the TX circuit, it is converted to the analog signal being base band signal, modulated with the RX calibration frequency, and then properly attenuated by the attenuators in the TX circuit 420. Finally, the resulting RX calibration signal is sent to the combiner 490 at the antenna RX frequency. The TX process is illustrated in the FIG. 4b with the solid line. Subsequently, the combiner 490 may duplicate the resulting RX calibration signal to the antennas 401-404, which further lead the resulting RX calibration signal into the corresponding RX circuits 410-413. As shown with the dash lines in FIG. 4b, in each RX circuit, the arriving RX calibration signal experiences the mixing by the RX working frequency, analog-to-digital conversion, etc. Finally the received RX calibration signals are output to the interface D1-D4, and they are further input into the calibration unit (not shown) for calibrating the antennas.

In the embodiment, the local oscillators can provide different frequencies for the antenna TX/RX circuits in the different antenna operation modes. For example, the RX circuit 410 is supplied with the RX working frequency in the normal antenna mode, and the TX calibration frequency in the antenna TX calibration mode. Likewise, the TX circuit 420 is supplied with the TX working frequency in the normal antenna mode, and the RX calibration frequency in the antenna RX calibration mode. In this way, the antenna TX/RX circuit can be reused as the antenna RX/TX calibration circuit. Furthermore, they does not introduce extra non-linearity to the calibration, the calibration is more accurate and stable.

Alternatively, in the embodiment, the radio communication device 40 may also be embedded with a control unit (not shown). In an embodiment, the control unit can be integrated on the TRXB 400. It may control the TX LO 430 and the RX LO 440 to modify the TX working frequency and the RX working frequency respectively, and accordingly the TX calibration frequency and the RX calibration frequency (the TX calibration frequency need to be set to consist with the TX working frequency, and the RX calibration frequency need to be set to consist with the RX working frequency, as described above), such that the TRXB 400 accommodating the antenna calibration circuits may be suitable to operate in both Time Division Duplex (TDD) system and Frequency Division Duplex (FDD) system, for example in both TDD device and FDD device.

Specifically, in a TDD device, the antenna TX frequency and the antenna RX frequency is in the same frequency band. If being used in the TDD device, the control unit will modify the TX working frequency and the RX working frequency supplied to the TX circuits and the RX circuits respectively, such that the signal can be transmitted and received at the antenna TX frequency and the antenna RX frequency which are equal to each other. On the other hand, in a FDD device, the antenna TX frequency and the antenna RX frequency is in the different frequency band. If being used in the FDD device, the control unit may modify the TX working frequency and the RX working frequency supplied to the TX circuits and the RX circuits respectively, such that the signal can be transmitted and received at the corresponding antenna TX/RX frequency.

As can be seen, by controlling the local oscillators to adapt the TX/RX working frequency dynamically, such antenna calibration circuit can be applied to both TDD device and FDD device. From the platform design point of view, it's possible to use the common TRXB accommodating such antenna calibration circuit for both TDD and FDD devices.

Figure 5:
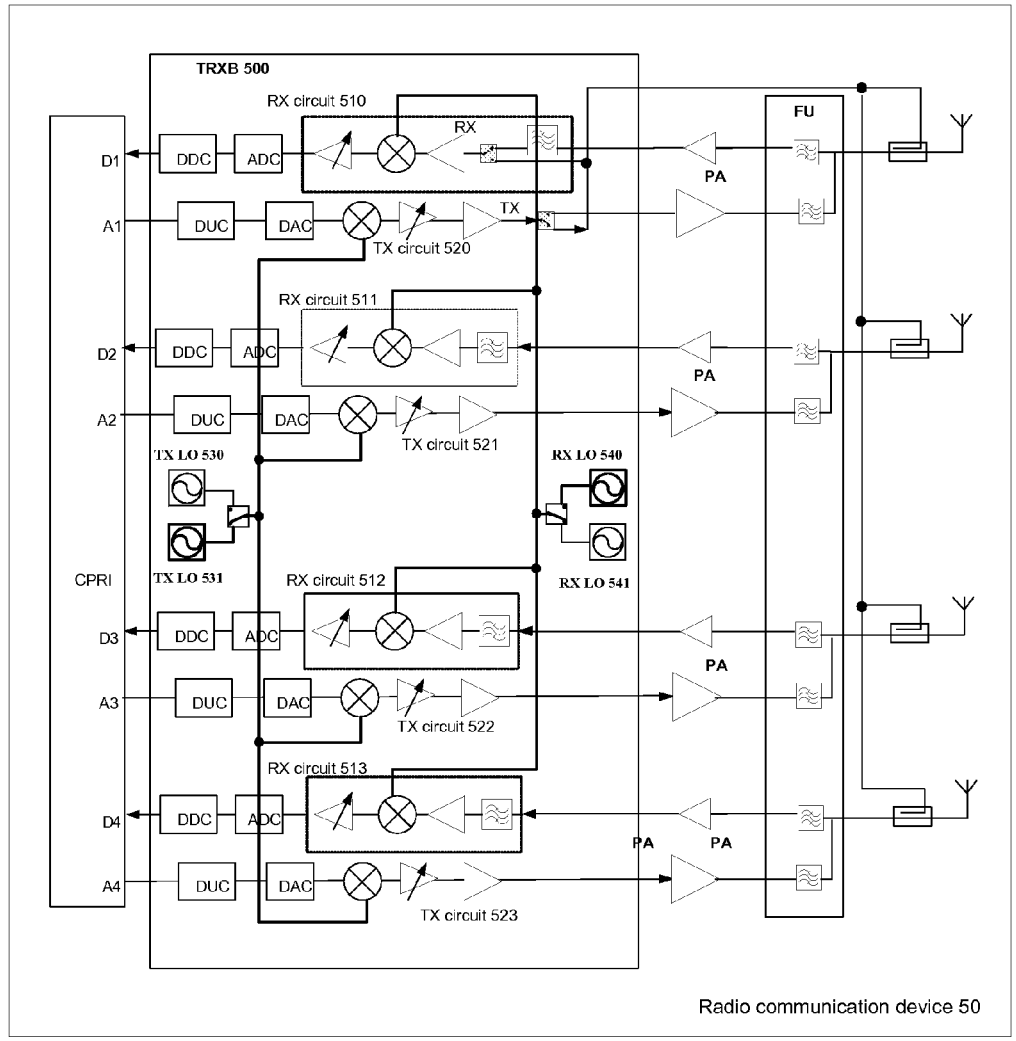
FIG. 5 schematically illustrates a diagram of multiple antennas calibration in the radio communication device, in accordance with another embodiment.

Furthermore, as known in the art, there is time delay for a local oscillator to switch between the supplying of the different frequencies. In order to avoid such time delay, in a embodiment, two more local oscillators can be introduced as illustrated in FIG. 5. In FIG. 5, the composition of the Radio communication device 50 is typically the same as that of the radio communication device 40 in FIG. 4, except that there are four local oscillators, i.e. TX LO 530, TX LO 531, RX LO 540 and RX LO 541. The TX LO 530 and TX LO 531 are coupled to individual TX circuits of the antennas, and the RX LO 540 and RX LO 541 are coupled to individual RX circuits of the antennas.

In a embodiment, the TX LO 530 is responsible for supplying the TX working frequency to the TX circuits in the normal antenna mode and the antenna TX calibration mode, and the TX LO 531 is responsible for supplying the RX calibration frequency to the TX circuits in the antenna RX calibration mode. Also, the RX LO 540 is responsible for supplying the RX working frequency to the RX circuits in the normal antenna mode and the antenna RX calibration mode, and the RX LO 541 is responsible for supplying the TX calibration frequency to the RX circuits in the antenna TX calibration mode.

Figure 7:
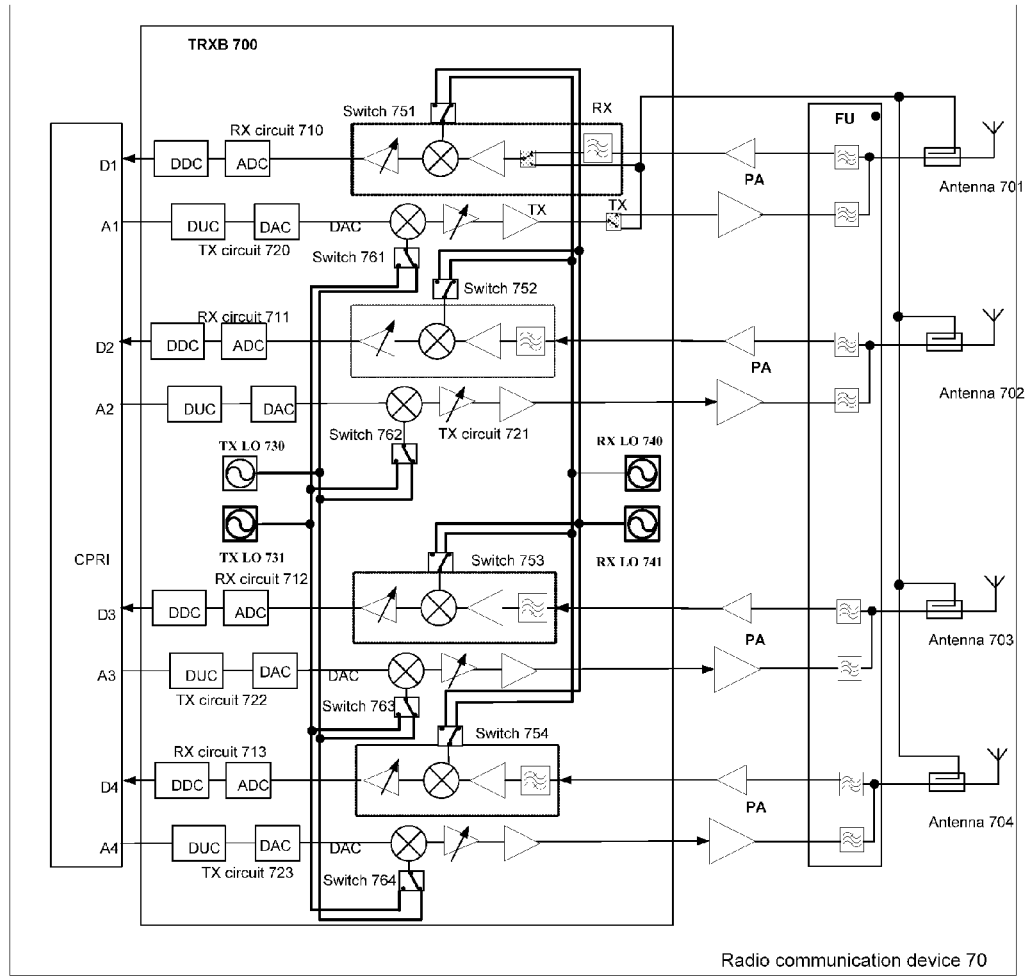
FIG. 7 schematically illustrates a diagram of multiple antennas calibration in the radio communication device, in accordance with a still further embodiment.

Alternatively, the switches can be coupled between the TX local oscillators and the individual TX circuits, between the RX local oscillators and the individual RX circuits, respectively. As illustrated in FIG. 7, the TX LO 730, TX LO 731, RX LO 740 and RX LO 741 in FIG. 7 perform the similar function as the TX LO 530, TX LO 531, RX LO 540 and RX LO 541 in FIG. 5 respectively, and the TX circuits 720-723 and RX circuits 710-713 perform the similar function as the TX circuits 520-523 and RX circuits 510-513 in FIG. 5 respectively. As shown in FIG. 7, the switches 761-764 are coupled between the TX LO 730-731 and TX circuits 720-723 (specifically the mixers of the TX circuits 720-723) respectively, and the switches 751-754 are coupled between the RX LO 740-741 and RX circuits 710-713 (specifically the mixers of the RX circuits 710-713) respectively. Since the TX LO 730 and 731 may also be used to supply the different TX working frequencies in the normal antenna operation mode, the radio communication device 70 may select which TX circuits to be supplied with the TX working frequency from the TX LO 730, and which TX circuits to be supplied with the TX working frequency from the TX LO 731 by switching the switches 761-764. For example, the switches 761-762 can be switched to connect the TX LO 730 with TX circuits 720-721, and the switches 763-764 can be switched to connect the TX LO 731 with TX circuits 722-723. Similarly, the radio communication device 70 may also select which RX circuits to be supplied with the RX working frequency from the RX LO 740, and which RX circuits to be supplied with the RX working frequency from the RX LO 741 by switching the switches 751-754. In this way, the dual band can be supported among the multiple antennas of the radio communication device.

Figure 6:
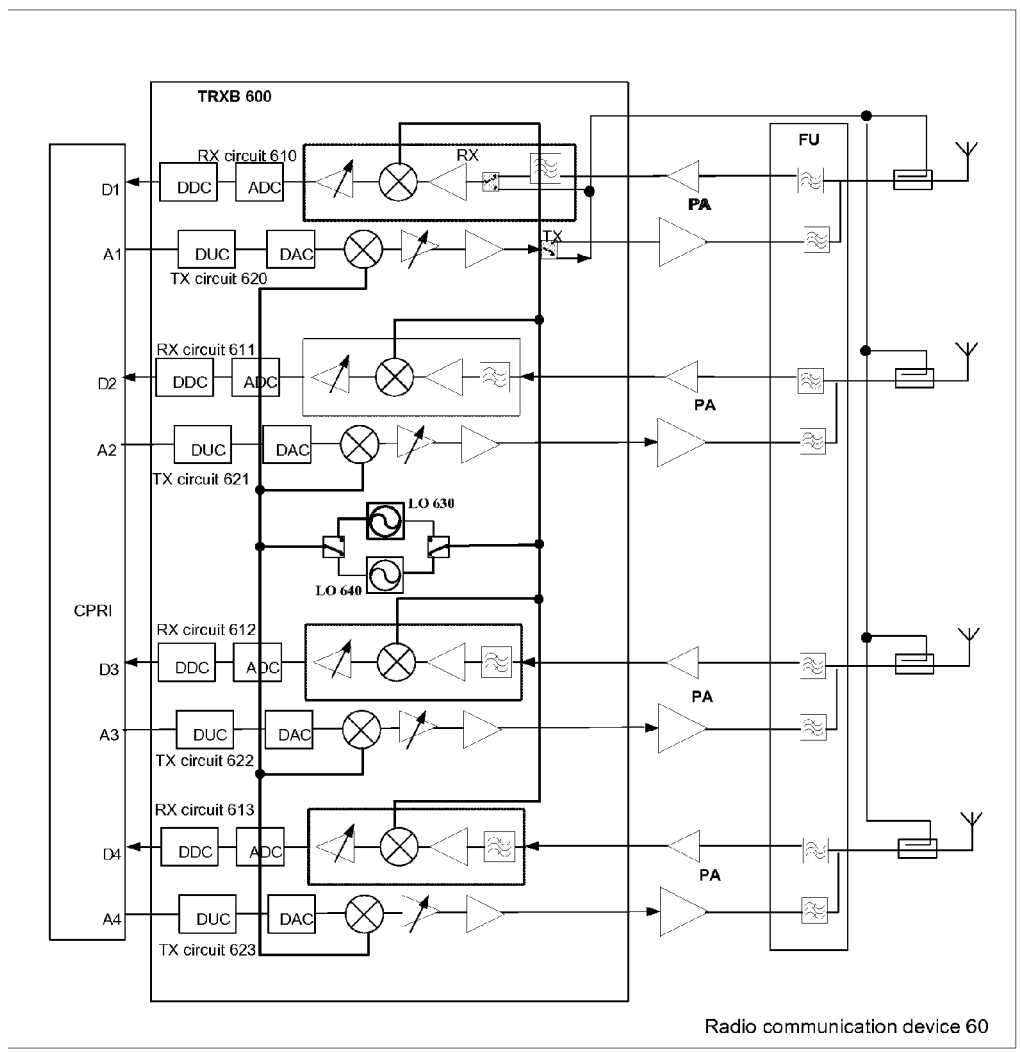
FIG. 6 schematically illustrates a diagram of multiple antennas calibration in the radio communication device, in accordance with a further embodiment.

FIG. 6 schematically illustrates a diagram of multiple antennas calibration in the radio communication device in accordance with a further embodiment. As illustrated in FIG. 6, the composition of the radio communication device 60 is typically the same as that of the radio communication device 40 in FIG. 4, except that LO 630 and LO 640 can be operably coupled to both the individual TX circuits and the individual RX circuits.

In the normal antenna operation, the LO 630 may be switched to connect with the TX circuits 620-623 to provide them with the TX working frequency, such that the signal can be transmitted at the antenna TX frequency by the radio communication device. At the same time, LO 640 may be switched to connect with the RX circuits 610-613 to provide them with the RX working frequency, such that the signal can be received at the antenna RX frequency by the radio communication device.

In the antenna TX calibration mode, since the TX calibration frequency needs to be equal to the TX working frequency, the LO 630, for example, can be switched to connect with the TX circuits 620-623 to provide them with the TX working frequency, and meanwhile connect with the RX circuits 610-613 to provide them with the TX calibration frequency. The antenna TX calibration is performed in the similar way as that described above with reference to FIG. 4a, which will not be repeated for brevity.

In the antenna RX calibration mode, since the RX calibration frequency needs to be equal to the RX working frequency, the LO 640, for example, can be switched to connect with the RX circuits 610-613 to provide them with the RX working frequency, and meanwhile connect with the TX circuits 620-623 to provide them with the RX calibration frequency. The antenna RX calibration is performed in the similar way as that described above with reference to FIG. 4b, which will not be repeated for brevity.

A method for calibrating multiple antennas in a radio communication device is provided, which will be described with reference to the FIGS. 4a and 4b now.

In a embodiment, firstly, an antenna calibration circuit can be established, for example, on the TRXB 400. The antenna calibration circuit comprises the TX LO 430 and the RX LO 440. The TX LO 430 is coupled to the TX circuits 420-423, and the RX LO 440 is coupled to the RX circuits 410-413. In the antenna TX calibration mode, the RX circuit 410, for example, may be configured to function as the calibration signal receiving circuit. In the antenna RX calibration mode, the TX circuit 420, for example, may be configured to function as the calibration signal transmitting circuit.

Next, when the antennas of the radio communication device work in the normal antenna operation mode, the radio communication device may control the TX LO 430 to provide the TX circuits 420-423 with the TX working frequency, such that the signal can be transmitted at the antenna TX frequency by the radio communication device.

Also, the radio communication device may control the RX LO 440 to provide the RX circuits 410-413 with the RX working frequency, such that the signal can be received at the antenna RX frequency by the radio communication device. Since the normal antenna operation mechanism is known to the skilled in the art, which therefore will not be described in more detail.

When the antennas of the radio communication device work in the antenna TX calibration mode, the radio communication device may control the TX LO 430 to provide the TX circuits 420-423 with the TX working frequency as in the antenna normal operation, whereas control the RX LO 440 to provide the RX circuit 410, which now functions as the calibration signal receiving circuit to receive the TX calibration signal from the antennas 401-404, with the TX calibration frequency. In order that the RX circuits 410 can receive the TX calibration signal successfully, the TX calibration frequency needs to be equal to the TX working frequency. The process of antenna TX calibration has been discussed as above, which will not be repeated for brevity.

When the antennas of the radio communication device work in the antenna RX calibration mode, the radio communication device may control the RX LO 440 to provide the RX circuits 410-413 with the RX working frequency as in the antenna normal operation, whereas control the TX LO 430 to provide the TX circuit 420, which now functions as the calibration signal transmitting circuit to transmit the RX calibration signal to the antennas 401-404, with the RX calibration frequency. In order that the TX circuits 420 can send the RX calibration signal that can be received by the individual antennas successfully, the RX calibration frequency needs to be equal to the RX working frequency. The process of antenna RX calibration has been discussed as above, which will not be repeated for brevity.

In the embodiment, the local oscillators provide different frequencies for the antenna TX/RX circuits in the different modes. For example, the RX circuit 410 is supplied with the RX working frequency in the normal antenna mode, and the TX calibration frequency in the antenna TX calibration mode. Likewise, the TX circuit 420 is supplied with the TX working frequency in the normal antenna mode, and the RX calibration frequency in the antenna RX calibration mode. In this way, the antenna TX/RX circuit can be reused as the antenna RX/TX calibration circuit. Furthermore, they does not introduce extra non-linearity to the calibration, the calibration is more accurate and stable.

Furthermore, as known in the art, there is time delay for a local oscillator to switch between the supplying of the different frequencies. In order to avoid such time delay, in a embodiment, the antenna calibration circuit may include two more local oscillators as illustrated in FIG. 5. In FIG. 5, the composition of the Radio communication device 50 is typically the same as that of the radio communication device 40 in FIG. 4, except that there are four local oscillators, i.e. TX LO 530, TX LO 531, RX LO 540 and RX LO 541. The TX LO 530 and TX LO 531 are coupled to individual TX circuits of the antennas, and the RX LO 540 and RX LO 541 are coupled to individual RX circuits of the antennas.

In an embodiment, the radio communication device may control the TX LO 530 to supply the TX working frequency to the TX circuits in the normal antenna mode and the antenna TX calibration mode, and control the TX LO 531 to supply the RX calibration frequency to the TX circuits in the antenna RX calibration mode. Also, the radio communication device may control the RX LO 540 to supply the RX working frequency to the RX circuits in the normal antenna mode and the antenna RX calibration mode, and control the RX LO 541 to supply the TX calibration frequency to the RX circuits in the antenna TX calibration mode.

Another method for calibrating multiple antennas in a radio communication device is provided, which will be described with reference to the FIG. 6 now.

In a embodiment, firstly, an antenna calibration circuit is established, for example, on the TRXB 600. The antenna calibration circuit comprises the LO 630 and the LO 640. The LO 630 and the LO 640 can be operably coupled to both the TX circuits 620-623 and the RX circuits 610-613. In the antenna TX calibration operation mode, the RX circuit 610, for example, may be configured to function as the calibration signal receiving circuit. In the antenna RX calibration operation mode, the TX circuit 620, for example, may be configured to function as the calibration signal transmitting circuit.

Next, in the normal antenna operation, the radio communication device may control the LO 630 to connect with the TX circuits 620-623 to provide them with the TX working frequency, such that the signal can be transmitted at the antenna TX frequency by the radio communication device. Also, the radio communication device may control the LO 640 to connect with the RX circuits 610-613 to provide them with the RX working frequency, such that the signal can be received at the antenna RX frequency by the radio communication device.

In the antenna TX calibration mode, since the TX calibration frequency needs to be equal to the TX working frequency, the radio communication device can control the LO 630, for example, to connect with the TX circuits 620-623 to provide them with the TX working frequency, and meanwhile connect with the RX circuits 610-613 to provide them with the TX calibration frequency. The antenna TX calibration is performed in the similar way as that described above with reference to FIG. 4a, which will not be repeated for brevity.

In the antenna RX calibration mode, since the RX calibration frequency needs to be equal to the RX working frequency, the radio communication device may control the LO 640, for example, to connect with the RX circuits 610-613 to provide them with the RX working frequency, and meanwhile connect with the TX circuits 620-623 to provide them with the RX calibration frequency. The antenna RX calibration is performed in the similar way as that described above with reference to FIG. 4b, which will not be repeated for brevity.

While the embodiments have been illustrated and described herein, it will be understood by those skilled in the art that various changes and modifications may be made, and equivalents may be substituted for elements thereof without departing from the true scope of the present technology. In addition, many modifications may be made to adapt to a particular situation and the teaching herein without departing from its central scope. Therefore it is intended that the present embodiments not be limited to the particular embodiment disclosed as the best mode contemplated for carrying out the present technology, but that the present embodiments include all embodiments falling within the scope of the appended claims.

The invention claimed is:

1. An apparatus for calibrating multiple antennas in a radio communication device, the radio communication device being configured with a transmission, TX, circuit and a receiving, RX, circuit for each of the multiple antennas, each pair of the TX circuit and the RX circuit coupled to the corresponding antenna in normal antenna operation, the apparatus comprising:

a first TX oscillator coupled to one or more of the TX circuits to supply the one or more TX circuits with a TX working frequency and a RX calibrating frequency, wherein the TX working frequency is supplied in the normal antenna operation and in an antenna TX calibration operation, and the RX calibrating frequency is supplied in an antenna RX calibration operation; and a first RX oscillator coupled to one or more of the RX circuits to supply the one or more RX circuits with a RX working frequency and a TX calibrating frequency, wherein the RX working frequency is supplied in the normal antenna operation and in an antenna RX calibration operation, and the TX calibrating frequency is supplied in an antenna TX calibration operation, wherein the TX working frequency is the same as the TX calibrating frequency, and the RX working frequency is the same as the RX calibrating frequency.

2. The apparatus according to claim 1, wherein the radio communication device further comprises:

a controlling circuit adapted to control the first TX oscillator and the first RX oscillator to modify the TX working frequency and the RX working frequency respectively, such that the apparatus is suitable to operate in both a Time Division Duplex, TDD, system and a Frequency Division Duplex, FDD, system.

3. An apparatus for calibrating multiple antennas in a radio communication device, the radio communication device being configured with a transmission, TX, circuit and a receiving, RX, circuit for each of the multiple antennas, each pair of the TX circuit and the RX circuit coupled to the corresponding antenna in normal antenna operation, the apparatus comprising:

a first TX oscillator coupled to one or more of the TX circuits to supply the one or more TX circuits with a TX working frequency in the normal antenna operation; and a first RX oscillator coupled to one or more of the RX circuits to supply the one or more RX circuits with a RX working frequency in the normal antenna operation, a second TX oscillator coupled to the one or more TX circuits to supply the one or more TX circuits with a RX calibrating frequency in an antenna RX calibration operation; and a second RX oscillator coupled to the one or more RX circuits to supply the one or more RX circuits with a TX calibrating frequency in an antenna TX calibration operation, wherein the TX working frequency is the same as the TX calibrating frequency, and the RX working frequency is the same as the RX calibrating frequency.

4. The apparatus according to claim 3, wherein in the antenna TX calibration operation, the first TX oscillator supplies the TX working frequency to the one or more TX circuits to transmit a TX calibration signal to the multiple antennas, and the second RX oscillator supplies the TX calibrating frequency to an RX circuit receiving one or more resulting TX calibration signals from the multiple antennas.

5. The apparatus according to claim 3, wherein in the antenna RX calibration operation, the second TX oscillator supplies the RX calibrating frequency to a TX circuit transmitting a RX calibration signal to the multiple antennas, and the first RX oscillator supplies the RX working frequency to the one or more RX circuits to receive a resulting RX calibration signal from one or more corresponding antennas.

6. The apparatus according to claim 3, further comprising switches coupled between the first and second RX oscillators and each of the one or more TX circuits, and between the first and second TX oscillators and each of the one or more RX circuits, such that a dual band mode of operation is supported among the multiple antennas.

7. An apparatus for calibrating multiple antennas in a radio communication device, the radio communication device being configured with a transmission, TX, circuit and a receiving, RX, circuit for each of the multiple antennas, each pair of the TX circuit and the RX circuit coupled to the corresponding antenna in normal antenna operation, the apparatus comprising:

a first oscillator coupled to one or more of the TX circuits to supply the one or more TX circuits with a TX working frequency, and coupled to one or more of the RX circuits to supply the one or more RX circuits with a TX calibrating frequency, wherein the TX working frequency and TX calibrating frequency are supplied in an antenna TX calibration operation; and a second oscillator coupled to the one or more RX circuits to supply the one or more RX circuits with a RX working frequency, and coupled to the one or more TX circuits to supply the one or more TX circuits with a RX calibrating frequency, wherein the RX working frequency and RX calibrating frequency are supplied in an antenna RX calibration operation, wherein the TX working frequency is the same as the TX calibrating frequency, and the RX working frequency is the same as the RX calibrating frequency.

8. A method for calibrating multiple antennas in a radio communication device, the radio communication device being configured with a transmission, TX, circuit and a receiving, RX, circuit for each of the multiple antennas, each pair of the TX circuit and the RX circuit coupled to the corresponding antenna in normal antenna operation, the method comprising:

establishing a calibrating circuit for the multiple antennas, wherein the calibrating circuit comprises a first TX oscillator and a first RX oscillator, wherein the first TX oscillator is coupled to one or more of the TX circuits to supply the one or more TX circuits with a TX working frequency and a RX calibrating frequency, and the first RX oscillator is coupled to one or more of the RX circuits to supply the one or more RX circuits with a RX working frequency and a TX calibrating frequency;

in an antenna TX calibration operation, controlling the first TX oscillator to supply the one or more TX circuits with the TX working frequency, and the first RX oscillator to supply the one or more RX circuits with the TX calibrating frequency, wherein the TX working frequency is the same as TX calibrating frequency; and in an antenna RX calibration operation, controlling the first TX oscillator to supply the one or more TX circuits with the RX calibrating frequency, and the first RX oscillator to supply the one or more RX circuits with the RX working frequency, wherein the RX working frequency is the same as RX calibrating frequency.

9. A method for calibrating multiple antennas in a radio communication device, the radio communication device being configured with a transmission, TX, circuit and a receiving, RX, circuit for each of the multiple antennas, each pair of the TX circuit and the RX circuit coupled to the corresponding antenna in normal antenna operation, the method comprising:

establishing a calibrating circuit for the multiple antennas, wherein the calibrating circuit comprises a first TX oscillator and a first RX oscillator, wherein the first TX oscillator is coupled to one or more of the TX circuits to supply the one or more TX circuits with a TX working frequency in the normal antenna operation, and the first RX oscillator is coupled to one or more of the RX circuits to supply the one or more RX circuits with a RX working frequency in the normal antenna operation;

wherein the calibrating circuit further comprises a second TX oscillator and a second RX oscillator, wherein the second TX oscillator is coupled to the one or more TX circuits to supply the one or more TX circuits with a RX calibrating frequency, and the second Rx oscillator is coupled to the one or more RX circuits to supply the one or more RX circuits with a TX calibrating frequency;

in an antenna TX calibration operation, controlling the second RX oscillator to supply the one or more RX circuits with the TX calibrating frequency, wherein the TX working frequency is the same as TX calibrating frequency; and in an antenna RX calibration operation, controlling the second TX oscillator to supply the one or more TX circuits with the RX calibrating frequency, wherein the RX working frequency is the same as RX calibrating frequency.

10. A method for calibrating multiple antennas in a radio communication device, the radio communication device being configured with a transmission, TX, circuit and a receiving, RX, circuit for each of the multiple antennas, each pair of the TX circuit and the RX circuit coupled to the corresponding antenna in normal antenna operation, the method comprising:

establishing a calibrating circuit for the multiple antennas, wherein the calibrating circuit comprises a first oscillator and a second oscillator, wherein the first oscillator is coupled to one or more of the TX circuits to supply the one or more TX circuits with a TX working frequency, and is coupled to one or more of the RX circuits to supply the one or more RX circuits with a TX calibrating frequency, the second oscillator coupled to the one or more RX circuits to supply the one or more RX circuits with a RX working frequency, and coupled to one or more TX circuits to supply the one or more TX circuits with a RX calibrating frequency;

in an antenna TX calibration operation, controlling the first oscillator to supply the one or more TX circuits with the TX working frequency, and to supply the one or more RX circuits with the TX calibrating frequency, wherein the TX working frequency is the same as the TX calibrating frequency; and in an antenna RX calibration operation, controlling the second oscillator to supply the one or more TX circuits with the RX calibrating frequency, and to supply the one or more RX circuits with the RX working frequency, wherein the RX working frequency is the same as RX calibrating frequency.

\* \* \* \* \*